(12) United States Patent
Xiang et al.

(10) Patent No.: US 11,544,453 B2
(45) Date of Patent: Jan. 3, 2023

(54) METHOD FOR CONFIGURING DOCUMENTS FOR CIRCULATION AND DEVICE IMPLEMENTING METHOD

(71) Applicant: Jiangyu Kangjian Innovation Medical Technology (Chengdu) Co., Ltd, Chengdu (CN)

(72) Inventors: Yang Xiang, Chengdu (CN); Neng-De Xiang, Shenzhen (CN); Wei-Cai Ma, Chengdu (CN); Xiao-Gang Zhong, Shenzhen (CN)

(73) Assignee: Jiangyu Kangjian Innovation Medical Technology (Chengdu) Co., Ltd, Chengdu (CN)

( * ) Notice: Subject to any disclaimer, the term of this patent is extended or adjusted under 35 U.S.C. 154(b) by 0 days.

(21) Appl. No.: 17/550,119

(22) Filed: Dec. 14, 2021

(65) Prior Publication Data

US 2022/0309238 A1    Sep. 29, 2022

(30) Foreign Application Priority Data

Mar. 25, 2021   (CN) .......................... 202110321330.0

(51) Int. Cl.
*G06F 17/00* (2019.01)
*G06F 40/186* (2020.01)
*H04L 51/214* (2022.01)

(52) U.S. Cl.
CPC .......... *G06F 40/186* (2020.01); *H04L 51/214* (2022.05)

(58) Field of Classification Search
CPC .......................... G06F 40/186; H04L 51/214
See application file for complete search history.

(56) References Cited

U.S. PATENT DOCUMENTS

| | | | |
|---|---|---|---|
| 2006/0020886 A1* | 1/2006 | Agrawal | G06F 40/174 715/256 |
| 2014/0033010 A1* | 1/2014 | Richardt | G06F 40/186 715/222 |
| 2017/0286389 A1* | 10/2017 | Ceneviva | G06F 40/106 |

FOREIGN PATENT DOCUMENTS

| | | |
|---|---|---|
| CN | 103838706 | 6/2014 |
| TW | 201327433 | 7/2013 |
| TW | 201525738 | 7/2015 |

* cited by examiner

*Primary Examiner* — Hassan Mrabi
(74) *Attorney, Agent, or Firm* — ScienBiziP, P.C.

(57) ABSTRACT

In a method for configuring documents for circulation, a document template and a plurality of field templates are created. The document template and the field templates are integrated to obtain an integrated document template. A workflow template is generated according to the integrated document template. A document entity is generated according to the integrated document template in response to a first user operation. The document entity is operated by a second user operation. A workflow entity derives from to the workflow template, the workflow entity including a plurality of node entities, and the node entities include a start node entity and an end node entity. The document entity is transferred from the start node entity to the end node entity according to the workflow entity. The method meets the requirements for general circulation of documents generated by a business with ever-increasing complexity.

20 Claims, 2 Drawing Sheets

METHOD FOR CONFIGURING DOCUMENTS FOR CIRCULATION AND DEVICE IMPLEMENTING METHOD

FIELD

The subject matter herein generally relates to data processing, specifically a method for document configuration and circulation and a computing device implementing the method.

BACKGROUND

In the operations of a company, many documents are generated, and some documents need to be circulated generally. However, the documents may be not flexible enough to meet the requirements of the ever-increasing complex business.

BRIEF DESCRIPTION OF THE DRAWINGS

In order to more clearly describe the technical solutions in the embodiments of the present disclosure or the prior art, the following will briefly introduce the drawings that need to be used in the description of the embodiments or the prior art. Obviously, the drawings in the following description are only examples. For those of ordinary skill in the art, other drawings can be obtained according to the provided drawings without creative work.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure. However, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

Figure 1:
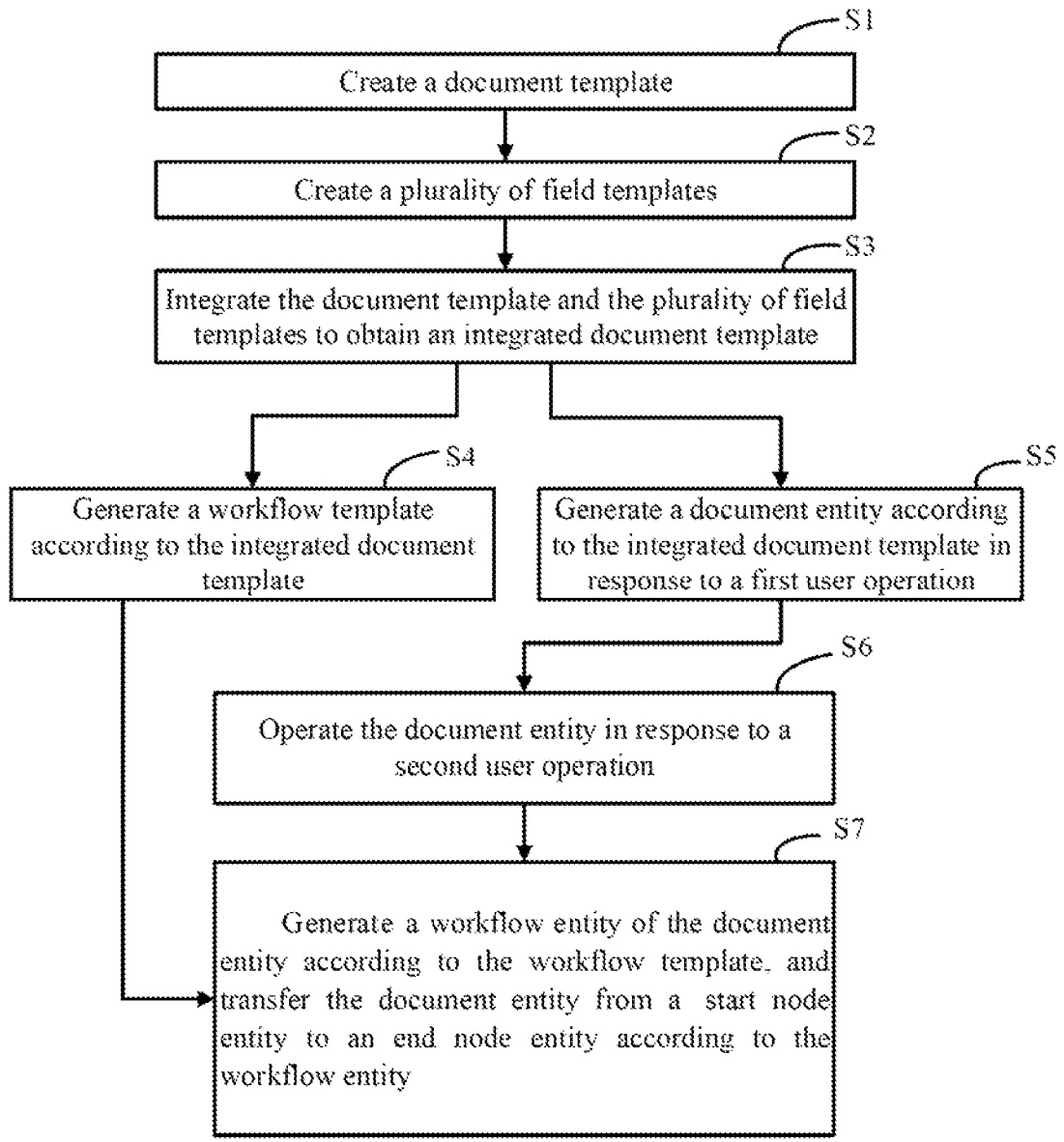
FIG. 1 is a flowchart of a method for configuring documents for circulation provided in one embodiment of the present disclosure.

FIG. 1 is a flowchart of a method for configuring documents for circulation in one embodiment. According to different requirements, the order of the steps in the flowchart may be changed, and some steps may be omitted.

Figure 2:
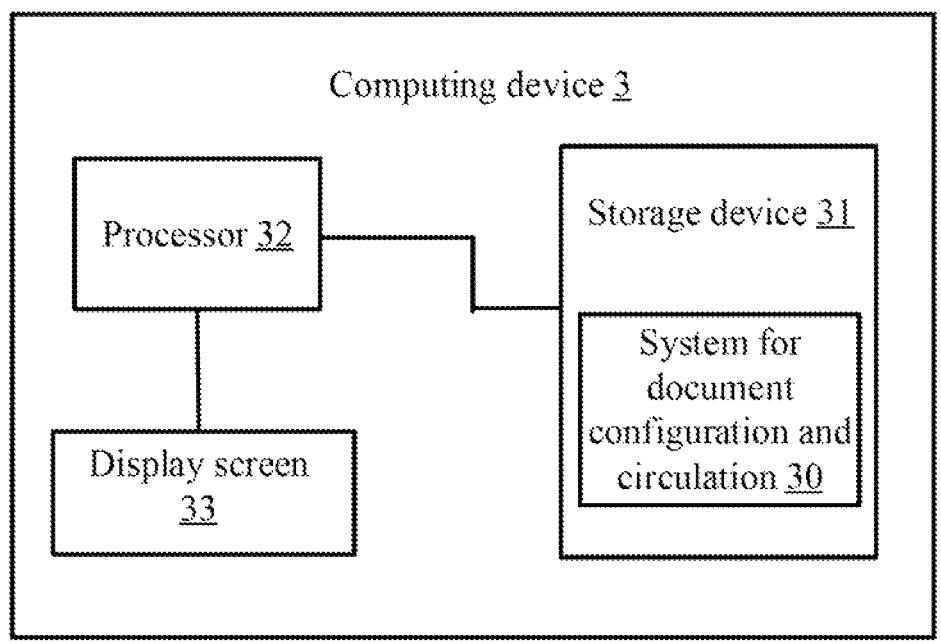
FIG. 2 is a block diagram of a computing device implementing the method in one embodiment of the present disclosure.

The method may be executed by a computing device (e.g., computing device 3 in FIG. 2). The computing device performs processing according to preset or stored instructions, and hardware of the computing device may include, but is not limited to, a microprocessor, an application specific integrated circuit (ASIC), a field-programmable gate array (FPGA), a digital signal processor (DSP), an embedded device, etc..

In block 51, the computing device creates a document template.

In one embodiment, multiple functional modules are included in the computing device. The multiple functional modules provide predetermined functions for the method for document configuration and circulation. The multiple functional modules may include a user management module, an organization structure module, a post maintenance module, a quick code definition module, a cascading module, a serial number configuration module, a file management module, and a field template definition module.

The user management module is configured to manage user information (such as employee number). The user management module may add, delete, modify, or query users.

The organization management module may is configured to manage organizational information such as organization unit names, organization unit number, and parent organization unit number.

The post maintenance module is configured to maintain post information such as post number, post name, and parent post number.

The quick code definition module is configured to define user gender (male, female), and business type (for example, contract, order, purchase, sales, etc.).

The cascading module is configured to define cascading fields, such as province-city. Each cascading field includes a first sub-field (such as province) and a second sub-field (such as city). A range of the second sub-field of the cascading field can be determined according to the sub-first field.

The serial number configuration module may include fixed characters that can be freely configured, for example, year, month, day, hour, minute, second, etc.

The file management module is configured to manage relevant information of files, such as file entities, file records, and file references. A file entity is a binary file stored in a preset storage device (for example, a disk). File records may be stored in a database. Use of a file is called a file reference.

The field template definition module may define multiple types of field templates, and patterns of each type of field template (such as a maximum length of a field). For example, the field template definition module defines a common field and a pattern of the common field, an amount field and a pattern of the amount field, a mobile phone number field and a pattern of the mobile phone number field, a mailbox field and a pattern of the mailbox field, a number field and a pattern of the number field, a quick code field and a pattern of the quick code field, a citation field and a pattern of the citation field, an automatically brought out field and a pattern of the automatically brought out field, a cascading field and a pattern of the cascading field, a time field and a pattern of the time field, a serial number field and a pattern of the serial number field, and a calculation field and a pattern of the calculation field, etc.

It should be noted that each post number may correspond to an organization unit number, and each organization unit number may correspond to multiple post numbers. Each post number may be associated to an employee number, and each post may correspond to multiple employee numbers. Each post may be a main post or a concurrent post. Each employee can correspond to one main post and multiple concurrent posts.

In one embodiment, a first document template name, a reference document template, conditions restricting references (restriction conditions) to the reference document template, and access authority of the document template may be defined for the document template. The reference document template has a second document template name and an alias. The alias of the reference document template is different from the second document template name. The alias is used to distinguish different reference document templates of a same category.

In one embodiment, the computing device may define the first document template name according to a service type of the document template, define the second document template name according to the first document template name, define the restriction conditions according to the first document template name, and define the access authority of the document template according to the first document template name. The access authority of the document template may include a view authority, a creation authority, and an edit authority. For example, when the service type of the document template to be generated is a contract, the first document template name can be defined as a contract template. According to the first document template name of the contract template, the second document template name, the restriction conditions, and the access authority of the contract template can be defined. For example, the restriction conditions may include reference document templates with contract amount greater than 5,000 yuan only can be referred by the contract template. The access authority of the contract template may specify which users can view, create, or modify the contract template.

In block S2, the computing device creates multiple field templates.

In one embodiment, a name, a type, field rules, and access authority may be defined for each field template.

In one embodiment, the computing device may use the field template definition module to define the name of each field template, and define the type, the field rules, and the access authority of the field template according to the name of the field template. The field rules of the field template may specify limits of the field template. For example, the field rules may specify a maximum length of the field template. The access authority of the field template may specify which users can view or modify the contract template, such users of the field template being highlighting in display. For example, the computing device may use the field template definition module to define a name of a certain field template as an insurance amount, define the type of the field template as an amount field, and define field rules of the amount field. The user management module may further define which users have the right to view and modify the insurance amount, being the highlighted users.

In block S3, the computing device integrates the document template and the field templates to obtain an integrated document template.

In one embodiment, the computing device may integrate the document template and the field templates according to predefined rules, and store the integrated document template into a storage device. The predefined rules may include: integrating the access authority of the document template, field templates required by the document template, and reference document templates that the document template needs to refer to. When integrating the reference document templates, access authority and field rules of the field templates required by the document template, and field templates of the reference document templates, are integrated together. For example, the computing device can integrate the access authority of the contract template, the field template (for example, insurance amount) required by the contract template, and a restriction condition that reference document templates with contract amount greater than 5,000 yuan also integrated into the contract template.

In block S4, the computing device generates a workflow template according to the integrated document template.

In one embodiment, the computing device may define the workflow template corresponding to the integrated document template, define node templates in the workflow template, and define one or more auditors and an action list for a node defined by each node template. The workflow template includes a plurality of node templates. The action list includes a determination action and a jump action. It should be noted that the workflow template is a workflow matrix composed of a two-dimensional array and a customized data structure.

The workflow template denotes a process of document circulation. The customized data structure may specify that each node template corresponds to one or more auditors and an action list. The determination action may include: determining whether the node meets a preset approval condition, or determining a preset field condition action corresponding to the node, or determining a preset process corresponding to the node. For example, the approval condition may be that one or all auditors of a certain organizational unit in the organization module must approve. The node action list may include a next action of the node if the node is given approval, and a next action of the node if the node is rejected. The preset field condition action may include determining certain fields in the document template, and determining a next action according to the certain fields. The preset process may include modifying a field value, sending an email, or SMS, etc. The jump action refers to jumping from a certain node template to a next node template of the node template.

In one embodiment, the workflow template may include a start node template and an end node template. A previous node template of the start node template is empty, and a next node template of the end node template is empty.

In block S5, the computing device generates a document entity according to the integrated document template in response to a first user operation .

In one embodiment, in response to the first operation, the computing device determines whether the user has a document creation authority according to the integrated document template. If the user does not have the document creation authority, the computing device issues a warning. If the user has the document creation authority, the computing device generates the document entity according to the integrated document template. The document entity is derived from the integrated document template The document entity may include access authority of the document entity, a type of each field entity, access authority of the field entity, and field rules of the field entity (the additional rules copied from the field template). The access authority of the document entity is copied from the access authority of the document template. The type of the field entity is copied from the types of the field templates. The access authority of the field entity is copied from the access authority of the field template. The field rules of the field entity are copied from the field rules of the field template.

In block S6, the computing device operates the document entity in response to a second user operation .

In one embodiment, in response to the second operation, the computing device fills in the document entity, and verifies contents filled into the document entity according to the integrated document template. If the contents filled into the document entity fail the verification, the computing device may notify the user of refilling required in the document entity. If the contents filled into the document entity are verified, the computing device may store the contents in the document entity.

In block S7, the computing device generates a workflow entity of the document entity according to the workflow template. The workflow entity includes multiple node entities. The multiple node entities included a start node entity and an end node entity. The computing device transfers the document entity from the start node entity to the end node entity according to the workflow entity.

In one embodiment, after the user submits the document entity, the computing device may generate the workflow entity of the document entity based on the workflow template.

In one embodiment, according to the workflow template, the computing device defines the multiple node entities, the auditors of each node entity, and an action list of each node entity. The workflow entity is copied from the workflow template, the node entity is copied from the node template, and the auditors and action list of each node entity are copied from the auditors and the action list of a corresponding node template. The start node entity is copied from the start node template, the end node entity is copied from the end node template, a previous node entity of the start node entity is blank, and a next node entity of the end node entity is blank. For example, when the next node entity of the node entity where the document entity is located is blank, the computing device determines that the audit of the document entity is finished.

The method of FIG. 1 meets the requirements of a business with ever-increasing complexity.

FIG. 2 is a block diagram of a computing device implementing the method for document configuration and circulation in one embodiment of the present disclosure. The computing device 3 may include a storage device 31, at least one processor 32, and a display screen 33. A computer program (such as a system for document configuration and circulation 30) may be stored in the storage device 31 and executable by the processor 32. The processor 32 may execute the computer program to implement the blocks in the method for document configuration and circulation described above, such as the blocks S1 to S7 in FIG. 1.

Those skilled in the art will understand that the block diagram is only an example of the computing device 3, and does not constitute a limitation on the computing device 3. Other examples of the computing device 3 may include more or fewer components than shown in FIG. 2, or combine some components, or have different components.

The computing device 3 may be a device that can process according to preset or stored instructions, such as a desktop computer, a notebook, a palmtop computer, or a cloud server. Hardware of the computing device may include, but is not limited to, a microprocessor, an application specific integrated circuit (ASIC), a field-programmable gate array (FPGA), a digital signal processor (DSP), an embedded device, etc..

The storage device 31 may be used to store the computer program, and the processor 32 implements the computing device by running or executing the computer program or module stored in the storage device 31 and calling data stored in the storage device 31 various functions. The storage device 31 may mainly include a storage program area and a storage data area. The storage program area may store an operating system, an application program required by at least one function, etc.; the storage data area may data and the like created according to the use of the computing device 3 are stored. In addition, the storage device 31 may include non-volatile memory, such as a hard disk, a memory, a plug-in hard disk, a smart memory card (SMC), a secure digital (SD) card, a flash memory card (Flash Card), at least one magnetic disk storage device, flash memory device, or other non-volatile solid state storage device.

The processor 32 may be a central processing unit (CPU) or other general-purpose processor, a digital signal processor (DSP), an application specific integrated circuit (ASIC), a field-programmable gate array (FPGA) or other programmable logic device, a discrete gate, or a transistor logic device, or a discrete hardware component, etc.. The processor 32 may be a microprocessor or any conventional processor. The processor 32 may be a control center of the computing device 3, and connect various parts of the entire computing device 3 by using various interfaces and lines.

In an exemplary embodiment, the computer program may be divided into one or more modules, and the one or more modules are stored in the storage device 31 and executed by the processor 32 to complete the method for document configuration and circulation of the present disclosure. The one or more modules can be a series of computer-readable instruction segments capable of performing specific functions, and the instruction segments are used to describe execution processes of the computer program in the computing device 3.

When the modules integrated in the computing device 3 are implemented in the form of software functional units and used as independent units, they can be stored in a non-transitory readable storage medium. Based on this understanding, all or part of the processes in the methods of the above embodiments implemented by the present disclosure can also be completed by related hardware instructed by computer-readable instructions. The computer-readable instructions may be stored in a non-transitory readable storage medium. The computer-readable instructions, when executed by the processor, may implement the steps of the foregoing method embodiments. The computer-readable instructions include computer-readable instruction codes, and the computer-readable instruction codes can be source code, object code, an executable file, or in some intermediate form. The non-transitory readable storage medium may include any entity or device capable of carrying the computer-readable instruction code, a recording medium, a U disk, a mobile hard disk, a magnetic disk, an optical disk, a computer memory, and a read-only memory (ROM).

The display screen 33 may be a display device capable of touch operations, for example, displaying a button for submitting a document that can be operated by a user, and issuing a warning when the user does not have a document creation authority.

Although not shown, the computing device 3 may also include a power source (such as a battery) for supplying power to various components. The power source may be logically connected to the at least one processor 32 through a power management device, so as to realize functions such as charging, discharging, and power consumption management. The power supply may also include any components such as one or more direct current or alternating current power supplies, recharging devices, power failure detection circuits, power converters or inverters, and power status indicators. The computing device 3 may also include various sensors, BLUETOOTH modules, WI-FI modules, etc.

In several embodiments provided in the preset application, it should be understood that the disclosed computing device and method may be implemented in other ways. For example, the embodiment of the computing device described above is merely illustrative. For example, the units are only obtained by logical function divisions, and there may be other manners of division in actual implementation.

The modules described as separate components may or may not be physically separated, and the components displayed as modules may or may not be physical modules, that is, may be located in one place, or may be distributed on multiple network elements. Some or all of the modules may be selected according to actual needs to achieve the purpose of the solution of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but do not signify any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A method for document configuration and circulation, comprising:
    creating a document template;
    creating a plurality of field templates;
    integrating the document template and the plurality of field templates to obtain an integrated document template;
    generating a workflow template according to the integrated document template;
    generating a document entity according to the integrated document template in response to a first user operation;
    operating the document entity in response to a second user operation;
    generating a workflow entity of the document entity according to the workflow template, the workflow entity comprising a plurality of node entities, and the plurality of node entities comprising a start node entity and an end node entity; and
    transferring the document entity from the start node entity to the end node entity according to the workflow entity.

2. The method for document configuration and circulation of claim 1, a method of creating a document template comprising:
    defining a first document template name of the document template;
    defining a second document template name of a reference document template according to the first document template name;
    defining restriction conditions of referring to the reference document template according to the first document template name; and
    defining access authority of the document template according to the first document template name.

3. The method for document configuration and circulation of claim 1, a method of creating a plurality of field templates comprising:
    defining a name of each field template; and
    defining a type, field rules, and access authority of the field template according to the name of the field template.

4. The method for document configuration and circulation of claim 1, a method of integrating the document template and the plurality of field templates comprising:
    integrating the document template and the field templates according to predefined rules; and
    storing the integrated document template into a storage device.

5. The method for document configuration and circulation of claim 1, a method of generating a workflow entity of the document entity according to the workflow template comprising:
    defining the workflow template corresponding to the integrated document template;
    defining node templates in the workflow template; and
    defining one or more auditors and an action list for a node defined by each of the node templates, the action list comprising a determination action and a jump action.

6. The method for document configuration and circulation of claim 5, the determination action comprising:
    determining whether the node meets a preset approval condition; or
    determining a preset field condition action corresponding to the node; or
    determining a preset process corresponding to the node.

7. The method for document configuration and circulation of claim 1, a method of generating a document entity according to the integrated document template in response to a first user operation; comprising:
    determining whether the user has a document creation authority according to the integrated document template;
    issuing a warning when the user does not have the document creation authority; and
    generating the document entity according to the integrated document template when the user has the document creation authority.

8. The method for document configuration and circulation of claim 1, a method of operating the document entity in response to a second user operation comprising:
    filling into the document entity;
    verifying contents filled into the document entity according to the integrated document template;
    notifying the user of refilling into the document entity when the contents filled into the document entity fail the verification; and
    storing the contents in the document entity when the contents filled into the document entity are verified.

9. The method for document configuration and circulation of claim 1, a method of generating a workflow entity of the document entity according to the workflow template comprising:
    defining the multiple node entities, auditors of each node entity, and an action list of each node entity according to the workflow template.

10. A computing device comprising a processor and a storage device, and the processor executing computer-readable instructions stored in the storage device to implement the following method:
    creating a document template;
    creating a plurality of field templates;
    integrating the document template and the plurality of field templates to obtain an integrated document template;
    generating a workflow template according to the integrated document template;
    generating a document entity according to the integrated document template in response to a first user operation;
    operating the document entity in response to a second user operation;
    generating a workflow entity of the document entity according to the workflow template, the workflow entity comprising a plurality of node entities, and the plurality of node entities comprising a start node entity and an end node entity; and
    transferring the document entity from the start node entity to the end node entity according to the workflow entity.

11. The computing device of claim 10, a method of creating a document template comprising:
    defining a first document template name of the document template;
    defining a second document template name of a reference document template according to the first document template name;
    defining restriction conditions of referring to the reference document template according to the first document template name; and
    defining access authority of the document template according to the first document template name.

12. The computing device of claim 10, a method of generating a workflow entity of the document entity according to the workflow template comprising:
    defining the workflow template corresponding to the integrated document template;
    defining node templates in the workflow template; and
    defining one or more auditors and an action list for a node defined by each of the node templates, the action list comprising a determination action and a jump action.

13. The computing device of claim 10, a method of generating a document entity according to the integrated document template in response to a first user operation; comprising:
    determining whether the user has a document creation authority according to the integrated document template;
    issuing a warning when the user does not have the document creation authority; and
    generating the document entity according to the integrated document template when the user has the document creation authority.

14. The computing device of claim 10, a method of operating the document entity in response to a second user operation comprising:
    filling into the document entity;
    verifying contents filled into the document entity according to the integrated document template;
    notifying the user of refilling into the document entity when the contents filled into the document entity fail the verification; and
    storing the contents in the document entity when the contents filled into the document entity are verified.

15. The computing device of claim 10, a method of generating a workflow entity of the document entity according to the workflow template comprising:
    defining the multiple node entities, auditors of each node entity, and an action list of each node entity according to the workflow template.

16. A non-transitory storage medium having stored thereon computer-readable instructions that, when the computer-readable instructions are executed by a processor to implement the following method:
    creating a document template;
    creating a plurality of field templates;
    integrating the document template and the plurality of field templates to obtain an integrated document template;
    generating a workflow template according to the integrated document template;
    generating a document entity according to the integrated document template in response to a first user operation;
    operating the document entity in response to a second user operation;
    generating a workflow entity of the document entity according to the workflow template, the workflow entity comprising a plurality of node entities, and the plurality of node entities comprising a start node entity and an end node entity; and
    transferring the document entity from the start node entity to the end node entity according to the workflow entity.

17. The non-transitory storage medium of claim 16, a method of creating a document template comprising:
    defining a first document template name of the document template;
    defining a second document template name of a reference document template according to the first document template name;
    defining restriction conditions of referring to the reference document template according to the first document template name; and
    defining access authority of the document template according to the first document template name.

18. The non-transitory storage medium of claim 16, a method of generating a workflow entity of the document entity according to the workflow template comprising:
    defining the workflow template corresponding to the integrated document template;
    defining node templates in the workflow template; and defining one or more auditors and an action list for a node defined by each of the node templates, the action list comprising a determination action and a jump action.

19. The non-transitory storage medium of claim 16, a method of generating a document entity according to the integrated document template in response to a first user operation; comprising:

determining whether the user has a document creation authority according to the integrated document template;

issuing a warning when the user does not have the document creation authority; and generating the document entity according to the integrated document template when the user has the document creation authority.

20. The non-transitory storage medium of claim 16, a method of operating the document entity in response to a second user operation comprising:

filling into the document entity;

verifying contents filled into the document entity according to the integrated document template;

notifying the user of refilling into the document entity when the contents filled into the document entity fail the verification; and storing the contents in the document entity when the contents filled into the document entity are verified.

* * * * *